June 29, 1971  D. G. FIELD  3,588,997
METHOD AND APPARATUS FOR MOUNTING ELASTIC ARTICLES
Filed April 4, 1969  6 Sheets-Sheet 2
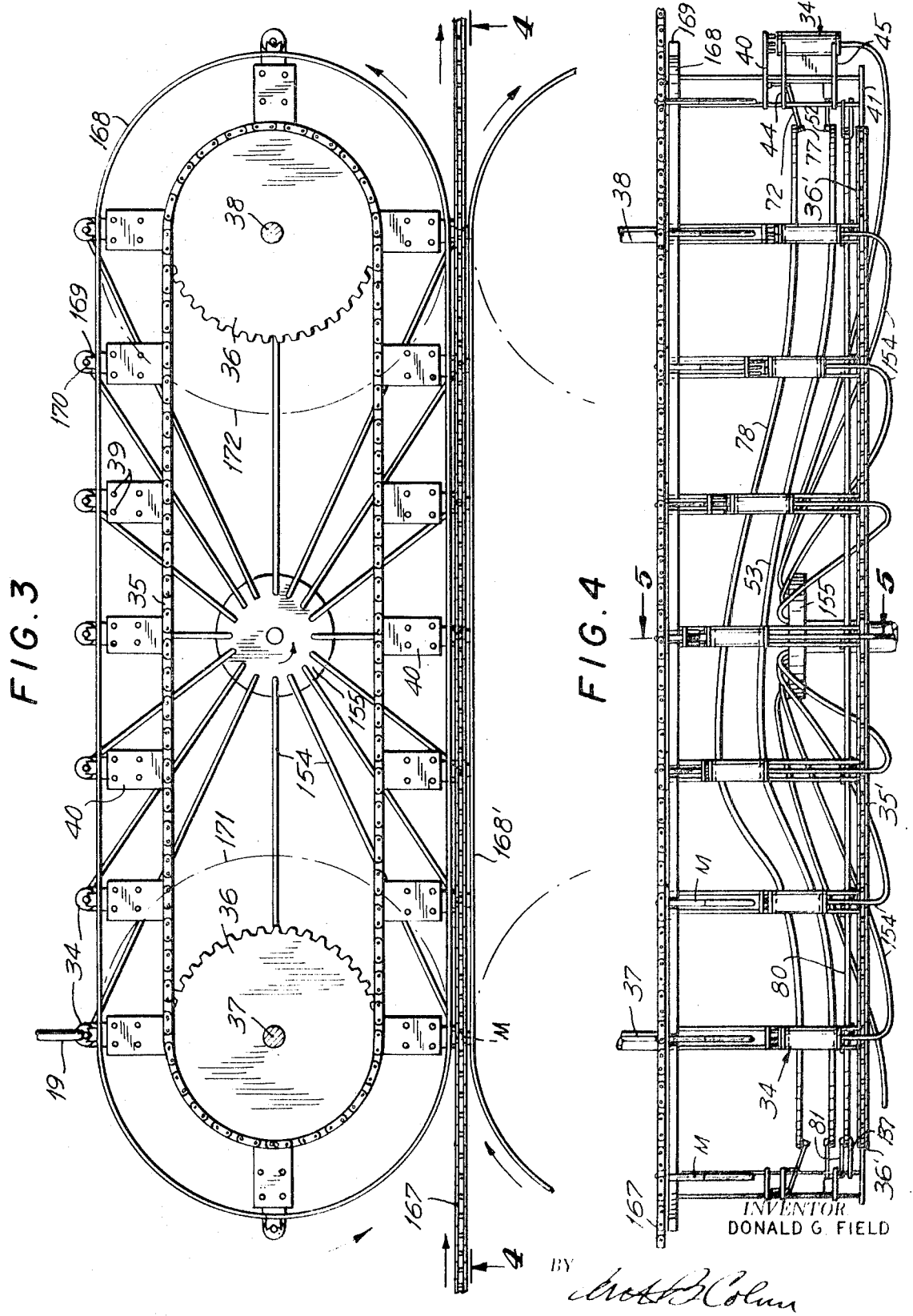

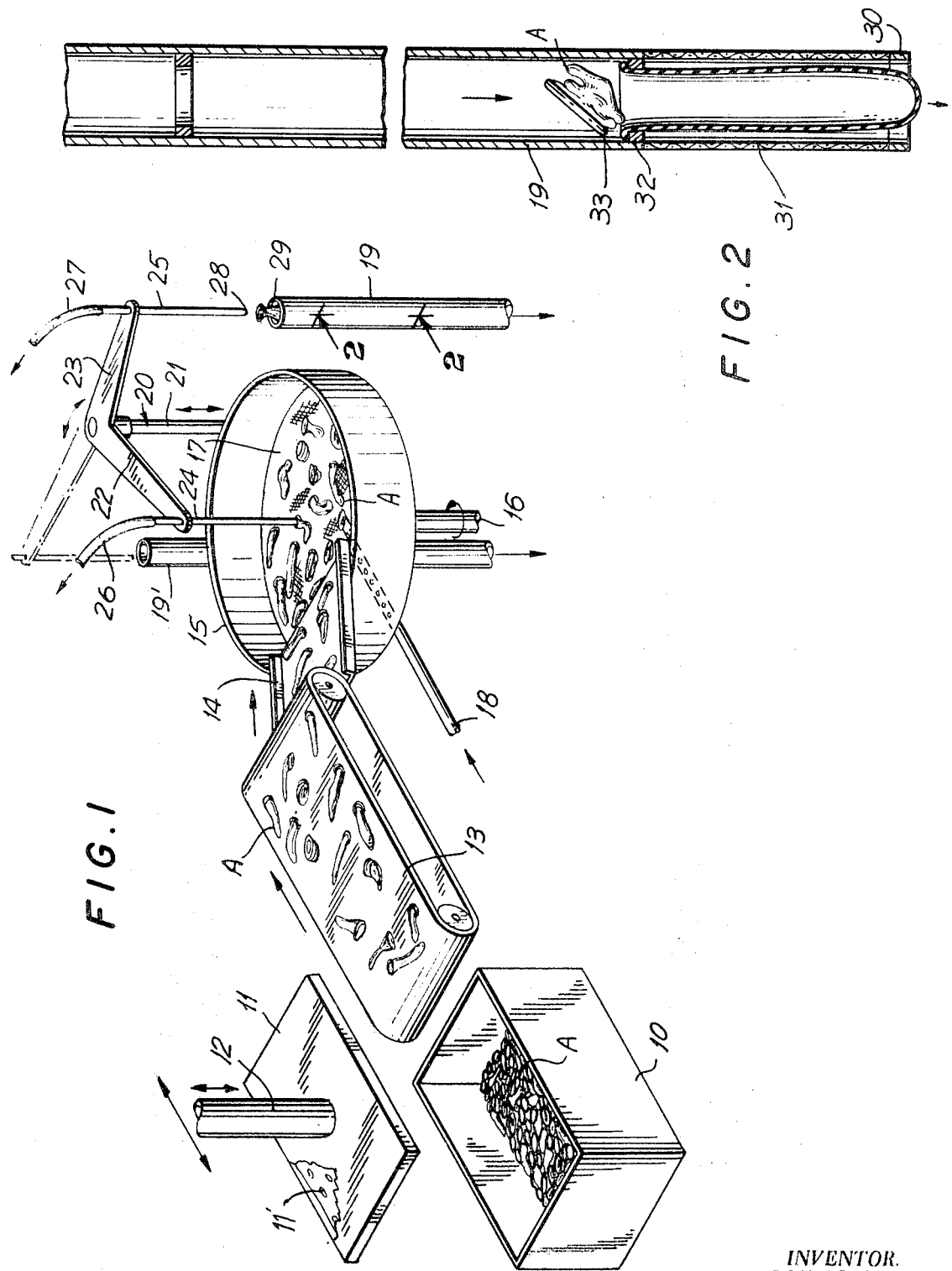

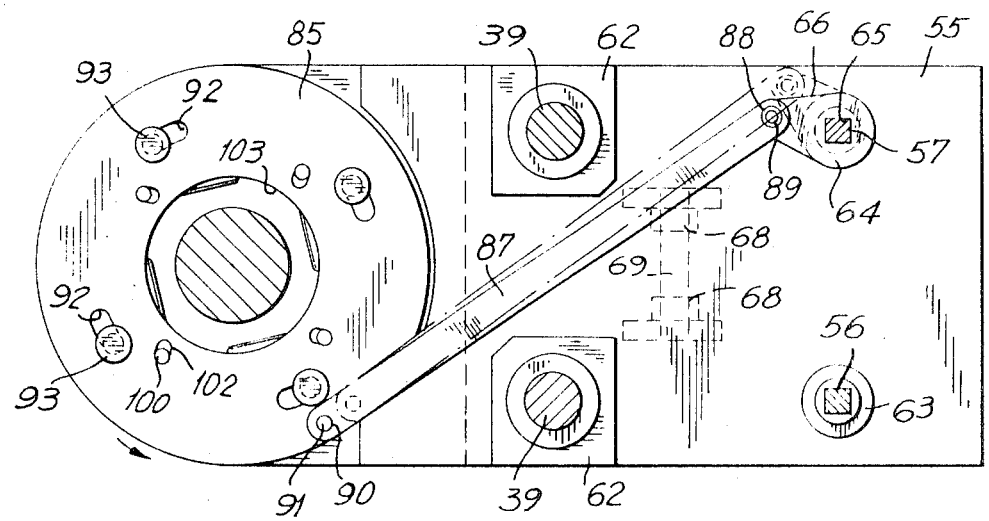
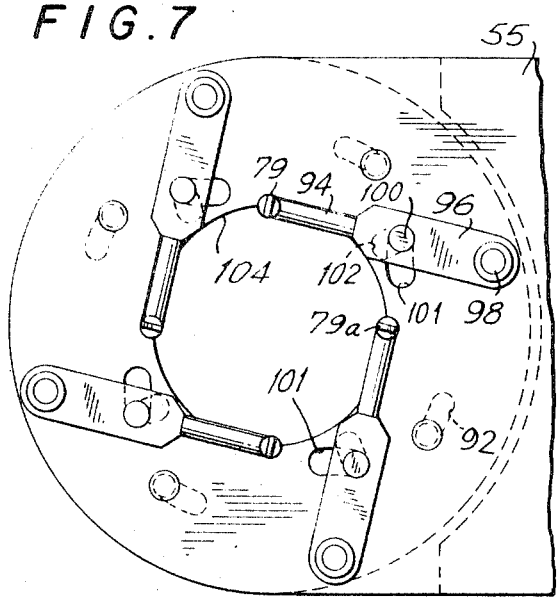
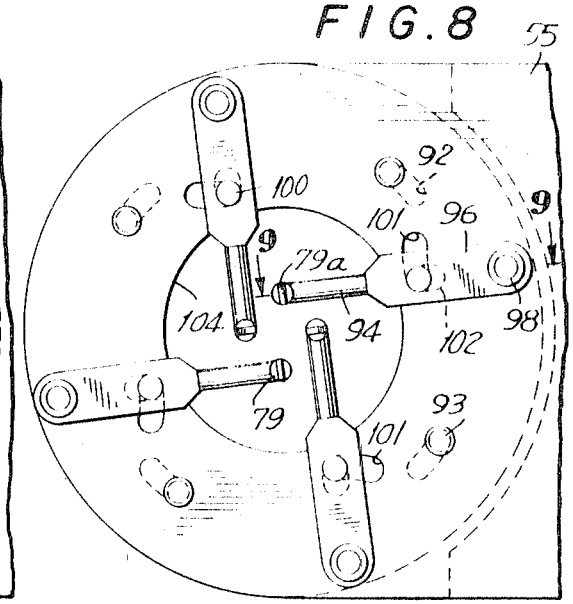
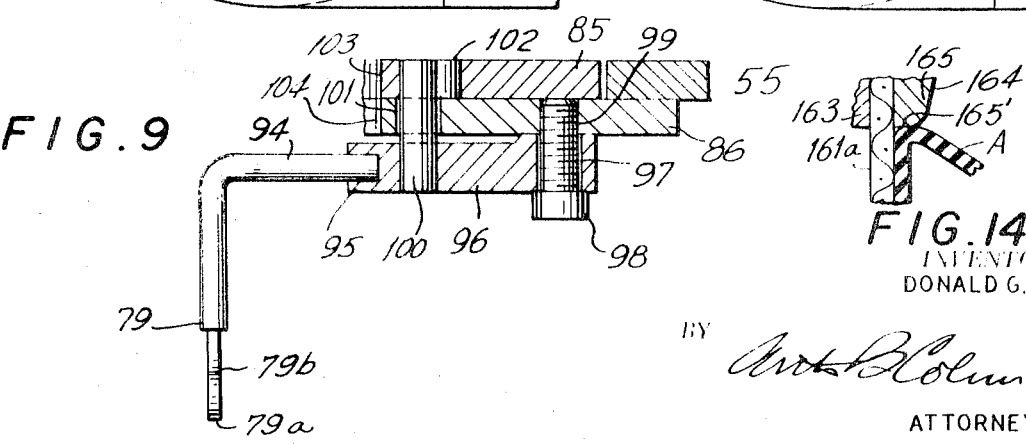

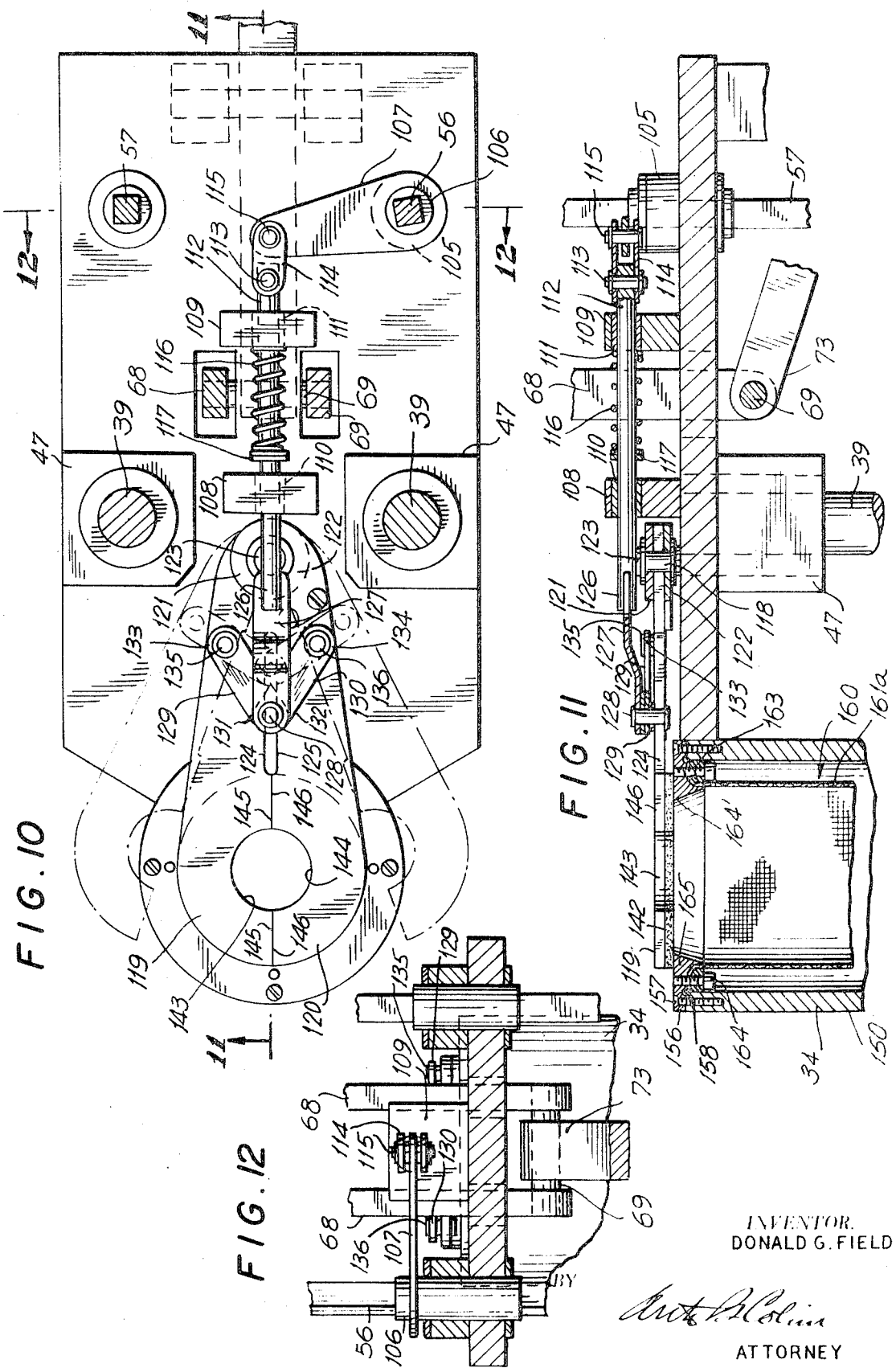

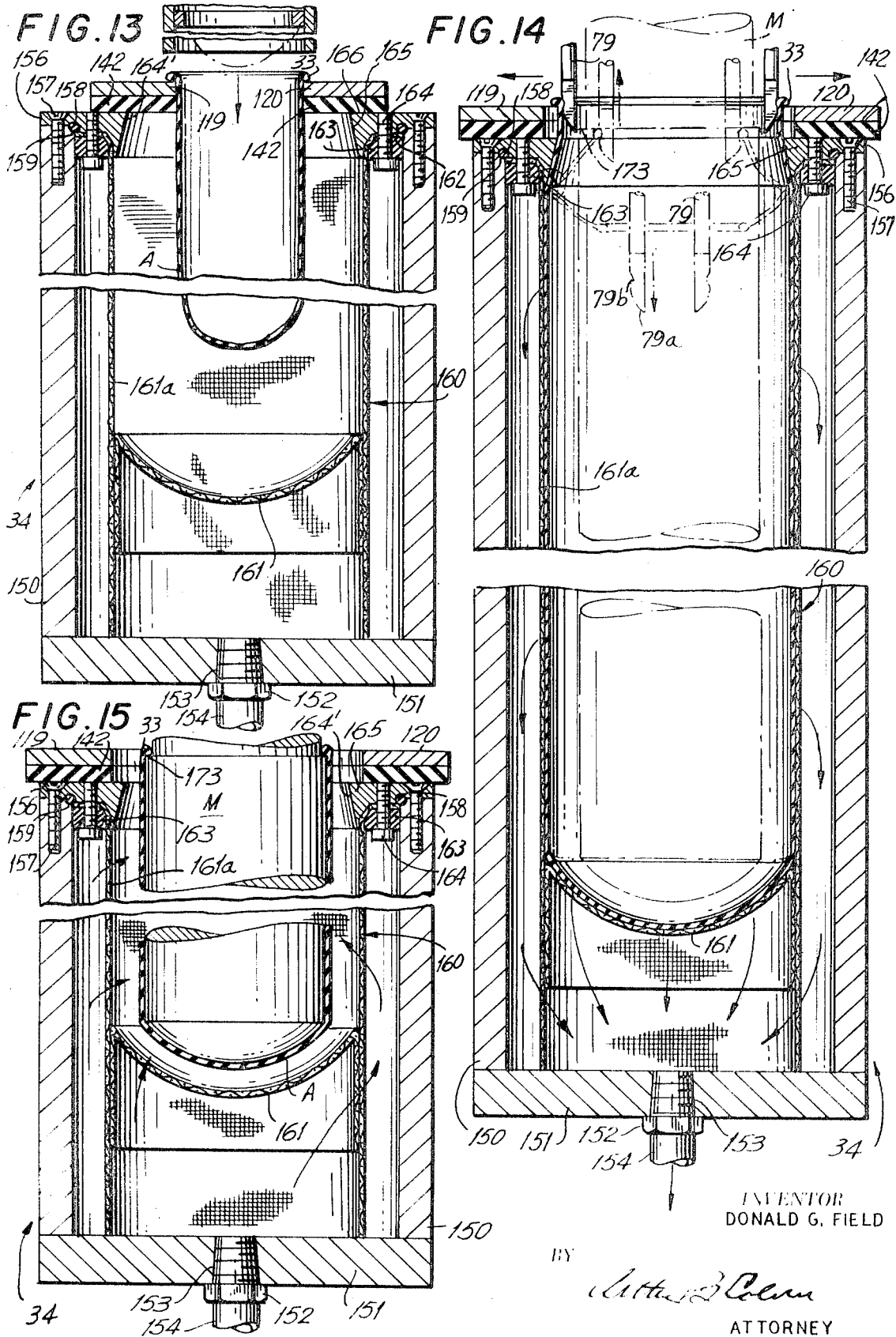

United States Patent Office 3,588,997
Patented June 29, 1971

1

3,588,997
METHOD AND APPARATUS FOR MOUNTING ELASTIC ARTICLES
Donald G. Field, Trenton, N.J., assignor to Youngs Rubber Corporation, Trenton, N.J.
Filed Apr. 4, 1969, Ser. No. 813,465
Int. Cl. B23p 11/02
U.S. Cl. 29—450                                 24 Claims

ABSTRACT OF THE DISCLOSURE

This disclosure relates to a method and apparatus for mounting elastic articles, such as condoms, finger cots or the like, on mandrels or similar forms, the interfit between the articles and mandrels being such that, after mounting, the articles are caused to be elastically supported on the mandrels.

---

This invention is in the field of processing elastic articles, such as condoms, finger cots and like stretchable elastic commodities. Particularly, this invention relates to articles of the type described which are manufactured in interrupted stages whereby the articles after initial manufacturing steps, are stored for curing or the like and after a storage period, are subjected to futher manufacturing or testing steps.

In manufacturing processes of this sort, particularly where the manufactured articles are comprised of latex or like elastomeric compositions, the articles are typically fabricated on mandrels or other forms, from which they are stripped for ageing. After the ageing or curing is completed, for further automated processing or testing of the articles, it is necessary that the latter be remounted on forms or mandrels.

Specifically, in the manufacture of condoms, the articles are fabricated by single or multiple dipping of shaping mandrels into a latex solution, the articles being thereafter subjected to various further drying and curing steps. Thereafter, the articles are stripped from the mandrels and cured. Following curing, the articles are remounted on other mandrels and subjected to various testing steps to assure that there are no faults in the fabricated article. After testing, the articles are again removed from the mandrels and packaged.

Heretofore the step of remounting the articles on the mandrels has been wasteful in terms of labor and materials. Specifically, it has heretofore been the custom manually to stretch the article and insert the mandrel thereinto, care being taken that the article and mandrel are in intimate contact throughout the entire extent thereof since such intimtae contact is required to assure the validity of subsequent testing steps to which the article is subjected.

Such testing may include utilization of a conductive material and may involve dipping the article supported by the mandrel into a conductive solution, thereby to define a capacitor of which the article forms the dielectric component. In such testing procedures, any leakage in the dielectric element is immediately detected by apparatus, a detailed description of which is beyond the purview of the present discussion.

The manufacture of the articles and the testing thereof after remounting on mandrels by and large are highly automated procedures. However, the operation of physically remounting the articles on mandrels has heretofore been manually effected. Surprisingly, it has been found that the

2 cost of this operation is a substantial portion of the total manufacturing costs of the finished articles.

In addition to the labor wastage in mounting the articles on the mandrels, it will be appreciated that many initially perfect articles are torn, pinched or abraded, and thus rejected by the testing apparatus, in the course of remounting the same on the mandrels.

It has been heretofore proposed to provide semiautomatic mechanism as substitutes for the hand mounting of the condoms. However, such devices have not proven reliable for a variety of reasons not the least of which has been their complexity. Also such devices engage against the condom as the mandrel is inserted giving rise to many of the deficiencies of hand mounting, including particularly the likelihood of local enlargement due to binding.

The present invention relates to automated means for mounting elastic, stretchable articles, such as condoms or the like, on mandrels or similar forms.

In accordance with the invention, the articles are introduced into a vacuum chamber and are maintained with their mouth portion in an open condition, a seal being effected between the exterior of the article adjacent the mouth and the interior of the vacuum chamber. Subatmospheric pressure conditions are created within the vacuum chamber, and the article is thus distended or pressed outwardly by the pressure differential resulting from the existence of a higher (atmospheric) pressure within the article. The article is thus caused to expand, preferably against a cage or pervious liner disposed within the vacuum chamber and corresponding to the desired shape of the expanded article. Expansion of the article results in the formation of a second seal between the exterior of the article and a portion of or insert within the chamber.

Thereafter, the mouth of the article is distended, an operation which is permitted without collapse of the elastic article, by reason of the formation of the second seal. The distension of the mouth permits the insertion into the still expanded article of a mandrel which is typically larger than the size of the unstretched article, but smaller than the size of the distended and expanded article. After insertion of the mandrel, the pressure is raised within the vacuum chamber, to permit the article to contract and thus elastically embrace the mandrel.

From the foregoing it will be appreciated that the method above described involves, generally, the steps of inserting an article into a chamber, the interior of which is capable of being reduced to sub-atmospheric pressures, forming a first seal adjacent the mouth of the article between the exterior of the article and the interior of the chamber, causing the pressure within the chamber and exteriorly of the article to be reduced to sub-atmospheric levels while the interior of the article is maintained in communication with the atmosphere, to induce an expansion of the article and the formation of a second seal in spaced relation to the mouth, stretching the portions of the article between the mouth and second seal, introducing the mandrel into the interior of the article through the spread mouth portion, and thereafter equalizing or otherwise increasing the pressures within the chamber exteriorly of the article, thus to permit the article to contract about and become supported on the mandrel.

The invention further relates to automated apparatus for accomplishing the aforementioned steps, which apparatus includes a series of movable vacuum chambers shiftable serially into proximate spaced relation to an article supply station, vacuum means operable at a first level within the chamber for inducing the articles to be shifted from the station partially into the chamber, means forming an exterior seal between the chamber and article adjacent the open mouth of the article, means for increasing the vacuum within the chamber to cause the article to expand within the chamber, preferably against a cage or pervious liner which limits the expansion of the article, the expansion additionally resulting in the formation of a second seal, means for spreading the mouth portion of the article to distend it to a dimension substantially commensurate with the dimension of the remainder of the article without relieving the vacuum about the exterior of the article, means for introducing a mandrel or like form into the interior of the distended article, and means for raising the pressure in the area between the exterior of the article and the vacuum chamber, to permit the article to contract and elastically grip the mandrel.

The above described apparatus is preferably completely automated, to require no or substantially no human attention other than a monitoring to confirm its continued proper operation.

The apparatus and method have the further advantage, by reason of the nature of the vacuum forces employed to distend the article, of inducing essentially uniform expansion over the entire area of the article and thus reduce the possibility of over-extension or expansion of any localized area of the article, with consequent possible damage to such area.

Accordingly, it is an object of the invention to provide a method and apparatus for mounting expansible, elastic open mouthed articles on mandrels or like forms.

It is a further object of the invention to provide a device of the class described which is suitable for automatic operation.

Still a further object of the invention is the provision of a device of the class described which is capable of mounting articles on mandrels with minimized possibility of damage.

Still a further object of the invention is the provision of an apparatus and method of the type described wherein the articles, after mounting on the mandrels, will be stretched or distended substantially equally at all portions thereof, so as to avoid conditions of local over-extension.

Still a further object of the invention is the provision of a method of mounting articles of the type described on mandrels or like forms, involving the steps of forming a seal adjacent the mount of the articles, subjecting the exterior of the articles to sub-atmospheric pressure, to cause an expansion of the articles and to cause a secondary seal area to be formed adjacent the first seal area, relieving the first seal by spreading the seal forming components, thereafter stretching the portions of the articles between the mouth and the second seal area, to permit the admission into the interior thereof of a mandrel, and thereafter relieving the vacuum against the exterior to permit the articles to shrink around the mandrels.

A further object of the invention is the provision of completely automated apparatus for accomplishing the steps noted.

To attain these objects and such further objects as may appear herein or be hereinafter pointed out, reference is made to the accompanying drawings, forming a part hereof, in which:

FIG. 1 is a perspective view, partially diagrammatic, disclosing means for removing articles from a bulk supply and depositing them individually at an initial pick-up station;

FIG. 2 is a magnified section taken on the line 2—2 of FIG. 1;

FIG. 3 is a plan view of the article mounting apparatus;

FIG. 4 is a side elevational view of the apparatus of FIG. 3, taken in the direction of the arrows 4—4;

FIG. 6 is a horizontal section taken on the line 6—6 of FIG. 5;

FIG. 7 is a horizontal section taken on the line 7—7 of FIG. 5;

FIG. 8 is a view similar to FIG. 7 showin gthe stretcher fingers in the contracted position;

FIG. 9 is a section taken on the line 9—9 of FIG. 8;

FIG. 10 is a section taken on the line 10—10 of FIG. 5;

FIG. 11 is a section taken on the line 11—11 of FIG. 10;

FIG. 12 is a section taken on the line 12—12 of FIG. 10;

FIGS. 13, 14 and 15 are vertical sections through the vacuum chamber in accordance with the invention, showing the progressive position of the parts, and FIG. 14a is a magnified view of the circled portion of FIG. 14.

Figure 5:
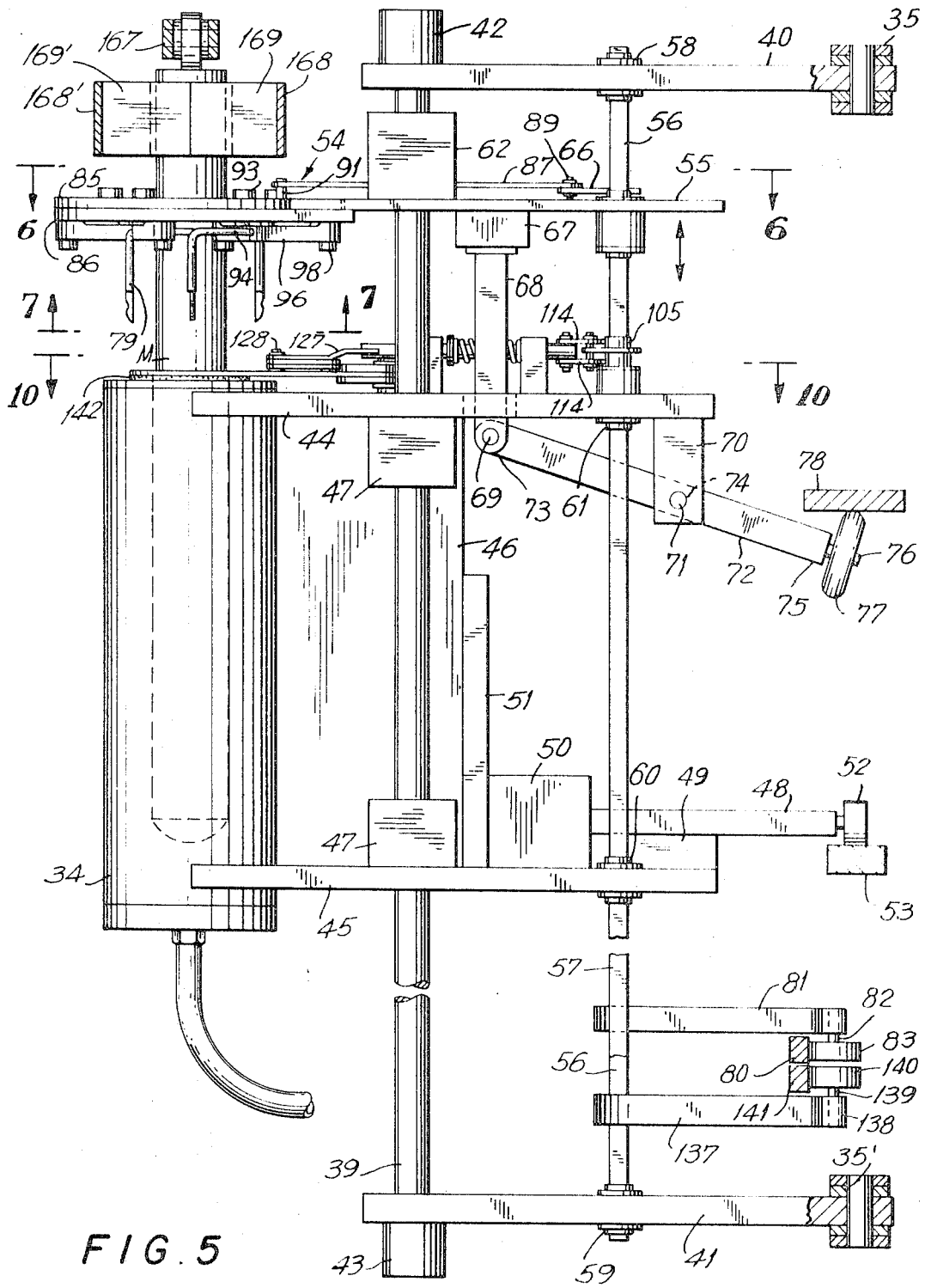
FIG. 5 is a magnified section taken on the line 5—5 of FIG. 4.

Referring now to the drawings, there is shown in FIG. 1 a bulk supply 10 of condoms or prophylactics which have been processed by being subjected to curing or ageing steps and are thus in condition for testing and final processing, including packaging. The articles A are removed from the bulk supply by a platen 11 operably connected with a suction conduit 12, within which a slight sub-atmospheric pressure is maintained. The platen is open at its underside and provided with a perforate base having spaced apart openings 11' so that the suction influences are effective at a plurality of spaced positions beneath the platen. The platen is articulated vertically and thereafter horizontally, in the direction of the arrows, to be disposed in spaced registry with the conveyor belt 13, the suction in conduit 12 being interrupted when the platen is in the registering position, so as to deposit the articles on the belt.

It will be understood that the platen is thereafter returned to a position immediately above the bulk supply 10 and thereafter shifted downwardly to pick up a new supply of articles. It will be further understood that alternate means for depositing the articles on the belt 13 may be employed.

The articles on the conveyor belt 13 are progressively deposited on slide 14, the lowermost end of which overlies a hopper 15 which is rotated on drive shaft 16. Preferably, the floor 17 of the hopper is formed of perforate material, such as screening or the like, to permit an air jet to be upwardly directed through the floor 17 of the hopper through puffer conduit 18, so as to agitate the articles and spread the articles in the hopper.

The articles are individually removed from the hopper and deposited selectively in one of two delivery tubes 19, 19', by a reciprocating pick-up mechanism 20. The mechanism 20 includes a rocker shaft 21, at the top of which is mounted an L-shaped fixture comprising a pair of spreader arms 22, 23. Each of the arms, adjacent the end thereof, carries a suction pipe 24, 25, the suction pipes being connected by flexible conduits 26, 27 to a source of intermittent suction.

The shaft 21, in addition to being rotatable about its vertical axis, may also be shifted vertically, in the manner indicated by the arrows, FIG. 1.

It will be appreciated that when the arm is in the solid line position, as shown in FIG. 1, the suction conduit 24 is connected to a source of suction and the suction pipe 25, which had therefore been connected to a suction source, is communicated by valving (not shown) to the atmosphere. It will be further appreciated that in said solid line position, the lower terminal end 280 of the pipe 25 is in registry with the upper end 29 of the delivery tube 19 and, thus, an article theretofore carried by the pipe will be released to the delivery tube.

At the same time, as shown in FIG. 1, the suction in pipe 24 will cause an article to be supported at the lower end of this pipe. Thereafter, the shaft 21 is elevated and pivoted through essentially a 90° pivot angle, to the dot and dash position shown in FIG. 1, whereupon the shaft is lowered so as to dispose the article secured to the lower end of the pipe 24 in registry with the entrance to the delivery tube 19′ and to dispose the lower end 28 of tube 25 into juxtaposition with the articles in the hopper.

It will be appreciated that at the dot and dash line position, the conduit 27 is connected to a source of suction and the suction in line 26 is relieved, to permit drop of the article into the delivery tube 19′.

From the following description it will be understood that the lowermost end 30 of the delivery tube 19 is disposed adjacent a pick-up station whereat the articles are progressively received by apparatus for mounting the articles on mandrels. It will be further appreciated that the tube 19′ may be used to deliver successive articles to a second article mounting apparatus or a second position within a single mounting apparatus.

Delivery tube 19 preferably includes a lower portion 31 formed of a tight mesh screen. An annular stop shoulder 32 is disposed at the junction of the slide and screen portions of the delivery tube. A moderate suction is maintained within the tube 19, inducing a downward air flow through the tube.

As the articles A fall into the tube, the resilient rim portions 33 of the articles are engaged against the shoulder 32 and the articles elongate under the influence of the suction, without substantial stretching, to assume an essentially unwrinkled but non-distended condition, as illustrated in FIG. 2.

As best seen in FIG. 3, the lower terminal end 30 of delivery tube 19 defines a pick-up station whereat the articles are transferred from the tube to one of a series of moving vacuum chambers 34 which are sequentially scanned across the pick-up station. The vacuum chambers are mounted for vertical shifting movement between a vertically spaced, registering pair of drive chains 35, 35′. The drive chains 35, 35′ are stretched between drive sprockets 36, 36 and lower drive sprockets 36′, 36′. One pair of vertically spaced sprockets 36, 36′ is driven by a first drive shaft 37, the other pair of sprockets 36, 36′ being mounted on a rotatable idler shaft 38.

The vacuum chambers 34, as best seen in FIG. 5, are each mounted to the chain by a pair of vertically directed slide rods 39. The slid rods 39 are, in turn, supported to the upper and lower chains 35, 35′ by upper and lower, horizontal support plates 40, 41, respectively, fixed to the chains 35, 35′, respectively. The rods 39 include reduced threaded portions (not shown) which pass through spaced apertures in the upper and lower support plates, the rods being fixed to the plates, as by upper and lower capping nuts 42, 43.

At vertically spaced points on the vacuum chambers are fixed upper and lower guide plates 44, 45, respectively, the plates being welded in parallelism with each other and normal to the chamber 34. Preferably, the plates 44, 45 are also connected by a vertically directed reinforcing web 46.

Each of the guide plates 44, 45 includes a pair of apertured slide blocks 47, 47, each disposed in sliding engagement with a different one of the rods 39.

From the foregoing, it will be apparent that the vacuum chambers are supported on the rods 39 for upward and downward movement by the sliding connection between the blocks 47 and the rods. In order to induce vertical movement of the vacuum chambers with respect to the rods 39, a side strut 48 is affixed as by welding, to reinforcing blocks 49, 50, 51, secured to the web 46 and lower guide plate 45.

At the distal end of the side strut 48 there is provided a free wheeling roller member 52 which rides on a guide track 53 arranged in an oval path corresponding approximately to the path of the chain flights 35, 35″, such that the roller 52 is continuously in engagement with the track 53 as the vacuum chambers are advanced by the chains. As will best be appreciated from FIG. 4, the cam track 53 includes lift and depression portions and, by reason of the connection with the roller 52, the vacuum chambers will be shifted vertically in accordance with the rises and dips of the track 53.

Each of the vacuum chambers carries a seal forming mechanism which is illustrated in detail in FIGS. 10 to 12, and an article spreading mechanism illustrated in detail in FIGS. 6 to 9.

The article spreader mechanism, which will be generally referred to as 54, is movable vertically relative to the vacuum chamber. The spreader mechanism 54 is carried by a spreader support plate 55. A pair of squared shafts 56, 57 extend between the upper and lower support plates 40, 41, the shafts being rotatably secured in upper bearing assemblies 58 to the plate 40, and lower assemblies 59 to the plate 41.

The shafts 56, 57 are free to rotate relative to the plates 40, 41 and are passed through registering apertures in the guide plates 44, 45, with respect to which plates they are likewise free to rotate. To permit such rotary movement, the plates 44, 45 are provided with bearing members 60, 61 which, in addition to allowing rotary movement, provide a slide fit with respect to the shafts 56, 57 so as not to interfere with the vertical movement of the chambers.

The spreader support plate 55 is provided with a spaced pair of slide blocks 62, 62 for slidably receiving the guide rods 39, to permit relative vertical movement between these parts.

As seen in FIG. 6, the plate 55 is provided with a bearing or clearance member 63 for the shaft 56, such that the shaft is free to rotate and shift vertically with respect to the plate and without interference herefrom. Conversely, he shaft 57 is passed through a bushing 64, pivotally mounted to the plate 55. The bushing 64 includes a squared keying aperture 65, through which the shaft 57 is passed, such that a sliding fit between the aperture and shaft is provided. However, it will be appreciated that the shaft 57 is in driving connection with the bushing so that rotation of the shaft in the manner and for the purpose hereinafter set forth, results in a pivotal movement of the bushing and a crank arm 66 made fast to the bushing relative to the plate 55.

The plate 55 and the spreader assembly carried thereon are vertically movable relative to the vacuum chambers 34. To achieve this vertical movement, a depending bracket 67, welded to the undersurface of plate 55, fixedly carries a spaced pair of parallel support links 68, 68. A transversely extending cross pin 69 fixedly connects the lower ends of the links 68. A bracket 70 is welded to the undersurface of the guide plate 44 and carries a horizontally directed fulcrum pin 71.

A lift lever 72 is pivotally connected at its outer end 73 to the pin 69 at the base of the links 68. The lever 72 includes a central aperture 74 pivotally mounted on the fulcrum pin 71. To the innermost end 75 of the lever 72 is mounted a stub shaft 76, carrying a roller 77. The upper surface of the roller 77 presses against the undersurface of a spreader lift track 78 which is disposed in vertically spaced relation to the cam track 53. It will be appreciated that when the vertical spacing of the tracks 53 and 78 remains the same, no relative movement of the guide plates 55 with respect to the vacuum chambers will occur. However, an upward movement of the plates 55 relative to the vacuum chambers will result from a closer approach of the track 78 to the track 53. It will be understood that when the track 78 converges toward track 53, the roller 77 is depressed and the resultant clockwise pivotal movement of the lever 72 lifts the link arms 68 and, as a consequence, the plate 55 carrying the spreader assembly. In similar fashion, plate 55 is lowered relative to the vacuum chambers 34 when tracks 78, 53 diverge.

The spreader assembly functions to open and close a series of spreader fingers 79 and to shift said fingers vertically. The spreading and contractile movement of the fingers 79 is effected responsive to rotation of the shaft 57, with the consequent rotation of the crank arm 66.

Rotation of the shaft 57 is effected by a third control track 80, vertically displaced from but in substantial registry with the tracks 53 and 78. A control lever 81 is made fast to the shaft 57. The lever includes a depending stub shaft 82, to the lower end of which is mounted a roller member 83. The roller member 83 engages against the inner face of the track 80, it being understood that the lever 81 is disposed at an angle relative to the track, i.e., the lever is not perpendicular to the track.

From the foregoing it will be appreciated that the lever will pivot in a horizontal plane responsive to inward and outward variations of the position of the track 80. It will thus be observed that the position of the crank arm 66 may be controlled between the dot and dash and the solid line positions shown in FIG. 6 responsive to rotations of the shaft 57, which rotations, in turn, are induced by pivotal movement of the lever 81 as controlled by the reflections imparted to the lever by track 80.

The spread or contracted positioning of the fingers 79 is best understood by reference to FIGS. 5 to 9. These movements are caused by relative rotation of upper and lower discs 85, 86, respectively. The rotary movement is imparted to the upper disc 85 by a drive link 87, pivotally connected at one end 88 to a pin 89 carried by the crank arm 66. The opposite end of the link 87 is provided with an aperture 90 within which is pivotally mounted a vertically directed pivot 91 fixed to disc 85. It will thus be understood that when the crank arm 66 is shifted from its solid to its dot and dash position, as shown in FIG. 6, an anti-clockwise rotation of the disc 85 relative to the disc 86 results.

The upper disc 85 is provided with a series of radially spaced apart arcuate clearance slots 92. A series of headed bolts 93 are threaded downwardly through the slots and into correspondingly tapped apertures in the lower disc 86. The undersurface of the bolts 93 do not bear tightly against the upper disc 85, thus permitting relative coaxial rotation of the discs without binding, within the limits of rotation provided by the clearance slots 92.

The fingers 79 are generally in the form of downwardly directed L members and include anchor arm portions 94, the distal ends 95 of which are fixedly mounted in pivot levers 96. Preferably, the lower portions of the fingers are shaped to define a beveled entrance portion 79a, the portions including outwardly directed article retainer notches 79b for receiving the rim of the condom in a manner hereinafter set forth. In the illustrated embodiment, the spreader assembly includes four fingers.

The pivot levers 96 are provided with vertically directed apertures 97, the levers being pivotally supported to the lower plate 86 by bolts 98 which extend upwardly through the apertures 97 and are threaded into complemental tapped apertures 99 formed in the plate 86. It will thus be observed that the bolts 98 support the pins to the lower plate 86 for pivotal movement about a vertical axis defined by the bolts.

The finger assemblies are each provided with an upwardly directed articulation pin 100, fixed to the levers 96. The pins pass upwardly through clearance slots 101 formed in the lower plate 86 and registering drive slots formed in the upper plate 85. It will be observed that the drive slots are arranged generally radially with respect to the discs while the clearance slots permit arcuate movement of pins 100 as the fingers pivot about bolts 98.

The discs 85, 86 are provided with registering central apertures 103, 104, the vertically directed portions 79 of the finger assemblies lying generally against the walls defining the perimeter of the apertures in the fully spread condition of the fingers (see FIGS. 6, 7). When the crank arm 66 is rotated, causing an anti-clockwise rotation of the upper disc 85, it will be observed that the fingers are shifted or pivoted inwardly from the position of FIG. 7 to the position of FIG. 8. This pivotal movement is induced by engagement of the drive slots 102 against the sides of pins 100, the clearance slots 101 in the lower plate being provided to accommodate the movement of the pins. It will thus be observed that the fingers 79 may be moved from the contractile position illustrated in FIG. 8 to the expanded position of FIG. 7, and back again, responsive to rotation of the shaft 57 controlled by cam track 80.

The operation of the seal forming mechanism will next be described, with particular reference to FIGS. 5, 10, 11 and 12.

Referring particularly to these figures, there is slidably mounted on the squared shaft 56, a drive bushing 105 which is slidable, relative to the shaft but which is provided with a squared aperture 106 to induce rotary movement of the shaft to the bushing. A bell crank lever 107 is fixed to the bushing. A pair of upstanding guide blocks 108, 109 are welded or otherwise secured to the upper end of guide plate 44, which is fixed to the vacuum chamber 34.

The guide blocks 108, 109 are provided with alignment apertures 110, 111, respectively, within which apertures a pull rod 112 is mounted for horizontal, reciprocal movement. A vertically directed pin 113 is passed through the pull rod, a pair of draw links 114 being mounted to the pin 113 above and below the pull rod. The opposite ends of the links 114 are provided with apertures mounted on a draw pin 115 carried by the end of the bell crank lever 107. A compression spring 116 is biased between the block 109 and a snap ring 117 mounted in a groove on the push rod, so as to impart a counterclockwise biasing force to the bell crank lever 107 (as viewed in FIG. 10).

It will be understood, therefore, that rotation of the shaft 56 in a clockwise direction will cause a left to right movement of the pull rod, which movement is accomplished against the biasing influence of the compression spring 116 (the directions being related to the showing of FIG. 10).

A bearing stud 118 is fixed to and extends upwardly from the plate 44, the axis of the stud being normal to the axis of the pull rod 112. A pair of sealer jaws 119, 120 is provided with overlapping inner end portions 121, 122, respectively. The major body portions of the jaws 119, 120 are disposed in the same horizontal plane, the inner portion 121 being bent downwardly so as to be in an offset parallel plane with respect to the portion 122 of the jaw 120. In this manner, the inner portions 121, 122 may be stacked one atop the other while the remaining portions of the jaws are disposed in coplanar relation, as previously noted.

The inner portions 121, 122 are provided with registering bearing apertures pivotally mounted on the shaft 118, the assembly being preferably retained on the shaft by a snap ring 123. One or more washers may be interposed between the snap ring and pivotal portions of the jaws and beneath these portions, so as to reduce vertical play to a minimum while permitting free pivotal movement of the jaws with respect to each other.

The jaws are preferably provided with clearance portions 124, 125, the clearance portions together defining a clearance slot.

The end 126 of the pull rod carries an extension 127, to which is affixed a depending trunnion 128, headed at its upper and lower ends, the trunnion extending into the slot defined by clearance portions 124, 125. A pair of toggle links 129, 130 are apertured adjacent their ends 131, 132, the apertures being pivotally received on the trunnion 128. The other ends 133, 134, respectively, of the links 129, 130 are secured by pivotal pins 135, 136, respectively, to the jaws 119 and 120, respectively.

From the foregoing it will be appreciated that when the draw bar 112 moves from left to right, as shown in FIG. 10, the trunnion 128 carried by the draw bar will be similarly moved, causing a spreading of the links 129, 130 and a concomitant spreading from the solid to the dot and dash position of the jaws 119, 120. The left to right movement of the draw bar is effected by a clockwise rotation of the shaft 56, the clockwise rotation, in turn, being accomplished by a shaft drive lever 137 affixed to the shaft 56.

The shaft drive lever 137 carries at its outer end 138 a vertically directed stub shaft 139, on which is mounted a followed roller 140, the follower roller engages against the outer face of a cam track 141 which, for the most part, parallels the track 80 which controls the shaft 56.

It will be appreciated that the pressure of the spring 116 tends to rotate the shaft 56 in such manner as to maintain the roller in constant contact with the track 141. The lever 137 is disposed at an angle relative to the track 141 and it will be observed that when the spacing of the track 141 from the shaft 56 increases, the follower 140, which scans the track, will induce a pivotal movement of the lever and, hence, a rotary movement of the shaft 56, resulting in a retraction of the pull rod 112 and spreading of the jaws 119, 120 in the manner previously discussed.

Similarly, when the track 141 approaches shaft 56 more closely, the spring 116 will shift the bar to the left, causing the jaws to close and inducing an anti-clockwise movement of the shaft 56.

As best seen in FIGS. 11 and 13, the undersurface of the end portions of the jaws are covered by yieldable gasketing segments 142, which segments, in the closed position of the jaws, together form an annulus.

The jaws 119, 120 are each formed with a semi-circular cutout 143, 144, respectively, the gasketing segments corresponding in dimension to the cutout. Preferably, the yieldable gasketing segments extend slightly beyond the mating lateral edges 145, 146 of the jaws 119, 120, respectively, so that when the jaws are closed under the pressure of spring 116, the gasketing segments meet in advance of the lateral edges 145, 146, to assure an airtight seal between the jaws.

Reference will now be made to details of construction of the vacuum chambers 34. The chambers comprise cylindrical elements 150, the bottom ends of which are defined by vacuum plate 151. A nipple or like fitting 152 is threadedly connected within aperature 153 in the bottom of the plate. The fittings 152 of the various chambers are connected by flexible conduits 154 to complemental fittings formed on a combined vacuum manifold head and distribution valve 155. The manifold head 155 is connected to a vacuum source and is arranged to vary the degree of vacuum applied to the various conduits 154 or communicate with conduits to the atmosphere, in accordance with the aperture position of the various chambers along the chains 35. The manifold head 155 is continuously rotated in timed relation to the chain, rotary movement bringing the conduits serially into predetermined metered vacuum source connections, thereby to time the degree of vacuum imparted to the chambers with the position of the chambers.

The upper end of the chambers is defined by an annular top plate 156, secured to the top of the chambers as by bolts 157.

An O-ring or similar gasket 158 is clamped between the upper plate 156 and an annular retainer groove 159 formed adjacent the upper end of the container 150 to form a seal. The upper plate 156 carries a pervious cage or screen 160, which acts in a manner more fully expained hereinafter, as a confining member to define essentially the expanded shape which the articles will be caused to assume. In the illustrated embodiment, the shape of the screen conforms essentially to the shape of the mandrel but is enlarged in all dimensions to permit ready access of the mandrel to the interior of the expanded article.

The screen or cage 160 includes a rounded lower portion 161, cylindrical sides 161a and an upper annular flange 162. The flange 162 is sandwiched against the upper plate by a compressible annular gasket 163. A plurality of headed retainer bolts 164 are passed upwardly through the gasket 163, through corresponding apertures in the screen flange, and are tightly threaded into the top plate 156. A relatively hard metallic ring (not shown) may be interposed betwen the bolts and the gasket to assure against damage to the gasket by the bolt heads.

When the plate 156 is secured against the top of the container by the bolts 157, a complete seal between these parts is effected.

The plate 156 includes a central, open mouth portion 164 defined at the upper end of a beveled, outwardly inclined frusto-conical neck portion 165 having a radially directed horizontal ledge 165'.

As best seen in FIG. 13, when the jaws 119, 120 are in the closed position, the gasket segments 142 are disposed directly against the upper face 166 of top plate 156, to form a seal between the top face and the gasket segments.

The mandrels or forms onto which the condoms or prophylactics are to be loaded are advanced by a mandrel chain 167, FIG. 2, along a linear path which is in vertical registry with the path of the vacuum chambers along a portion of their cycle of movement. The mandrels M are pivotally connected to the chain 167 for facilitating subsequent operations not germane to the present invention.

In order to maintain the mandrels in an essentially vertical orientation during the mounting procedure, a flexible non-slip belt 168 carries a series of spaced blocks 169, the outer ends of which are formed with outwardly open V conformations 170. The belt 168 is supported and driven by driver and idler pulleys 171, 172 mounted on drive and idler shafts 37, 38 respectively.

Optionally and preferably, as shown in FIG. 3, a second belt 168', driven by an adjacent apparatus which may be a duplicate of the above described apparatus, is disposed at the opposite side of the mandrel and incorporates similar V blocks which restrain the mandrels from pivoting away from the belt 168.

The configuration of the mandrel is best appreciated from an inspection of FIG. 14. As appears therefrom, the mandrel is essentially an elongated cylindrical configuration having a rounded lower end portion and including a retainer shoulder 173 of reduced diameter as compared to the major body portion of the mandrel. The portions of the mandrel M above the shoulder 173 are likewise of cylindrical configuration but of lesser diameter than the lower mandrel portion, it being understood that the uppermost end of the mandrel is pivotally fixed to the mandrel drive chain 167.

OPERATION

In the manner previously set forth, a prophylactic is lodged in the delivery tube 19. Vacuum chambers are continuously advanced by the drive chains 35. As a vacuum chamber 34 approaches the station adjacent the delivery tube 19 (see FIG. 13), the vacuum chamber is in a lowered position and a moderate vacum is communicated to the interior of the chamber through the conduit 154 connected to the manifold 155. The suction developed within the container is sufficient to draw the condom which was heretofore supported by the engagement between the rim 33 and the shoulder 32 clear of the delivery tube and into the solid line position shown in FIG. 13. The pulling force required to achieve this downward movement is developed by the close positioning of the lowermost end of the condom to the upper end of the vacuum chamber.

As will be seen from FIG. 13, the jaws 119, 120 at this station are in the closed or solid line position shown in FIG. 10, and thus define a cover for the vacuum chamber, the orifice defined between the cutouts 143, 144 forming a receiving aperture for the vacuum chamber.

The article is drawn down from the delivery tube so that the rim 33 is seated on the upper portions of the jaws, the body of the article extending through the cutout and into the interior of the vacuum chamber. It will thus be seen that the engagement of the jaws about the neck of the condom adjacent the rim 33 and the engagement of lower portions of the rim against the top portion of the jaws surrounding the cutouts 143, 144 defines a seal at such position.

In the ensuing description, the various movements including spreading of the jaws 119, 120, upward and downward movement of the spreader assembly 54, opening and closing of the fingers 79 of said assembly, and upward and downward movement of the vacum chambers will be recited. Since the operation of the various components has been described in detail and the manner of their control and movement by the various cam tracks 141, 80, 78 and 53, fully explained, detailed discussion of the position and interaction of the tacks and follower rollers is not needed.

The article, positioned in the vacuum chamber as shown in FIG. 13, is progressively shifted from the delivery tube station and simultaneously the pressure within the chamber is decreased. As a result of such decreased pressure and the fact that the mouth of the condom is maintained open and hence in communication with the atmosphere, the interior of the article is subjected to greater pressure than the exterior, causing the article gradually to expand to a limiting position defined by the shape of the cage 160. The article thus assumes the position of FIG. 14, with the rim 33 of the condom in the broken line position, since the rim is still retained within the closed jaws 119, 120 which, as noted, defines a seal with said rim about the exterior of the condom.

When the article (except the rim) is fully distended, it will be observed that a double seal is formed; namely, the seal between the rim 33 and the jaws, as previously defined, and a second seal area between the exterior of the condom and the lowermost ledge portions 165' of the beveled side wall 165 of the upper plate 156 of the vacuum chamber (see FIG. 14a). The formation of the second seal permits the jaws 119, 120 to be subsequently opened without compromising the vacuum in the vacuum chamber below the second seal area.

The spreader mechanism, with the fingers in the contractile position shown in FIG. 8, is next moved downward relative to the still lowered vacuum chamber, the fingers 79 entering into the interior of the condom through the mouth portion (see the contracted broken line position of the fingers, FIG. 14) which is preferably still supported against the closed jaws. It is to be noted that the jaws 119, 120 may be caused to open prior to entry of the fingers 79 into the interior of the condom, thereby releasing the rim of the condom from the jaws 119, 120 so that the portions of the condom above ledge 165' will droop to the lower dot and dash position shown in FIG. 14.

The fingers 79 will thereupon be simultaneously raised and spread from the lower dot and dash position of FIG. 14 to the upper dot and dash position thereof. It will be observed from comparing said two dot and dash positions of the fingers 79 and condom, that the combined lifting and spreading movements of the fingers has caused the rim of the condom to be engaged in the notch portions 79b of the fingers whereby the drooping portion of the condom is lifted and spread to the solid line position shown in said FIG. 14.

The vacuum chamber continues to be advanced and is progressively raised, the upward relative movement of the chamber causing a mandrel M (see dot and dash lines in FIG. 14, which is advancing in timed relating in the chamber) to be introduced into the interior of the article through the stretched mouth and distended body portion. The vacuum chamber and mandrel are continuously advanced and the spreader assembly 54 is again moved upwardly relative to the vacuum chamber, the upward movement being preferably accompanied by a partial contractile movement of the fingers 79 so as to reduce to an absolute minimum any friction engagement between the noted parts.

With the spreader fingers removed from the interior of the condom and with the mandrel in position, the conduit 154 is opened to the atmosphere by the manifold-control valve 155, whereupon the pressures interiorly and exteriorly of the condom are equalized and the condom is permitted to contract under its natural elasticity and engage against the mandrel M in the position shown in FIG. 15. The vacuum chamber is thereafter shifted downwardly, thus resulting in a withdrawal of the mandrel carrying the condom from an interior of the chamber. In the mounted position, the rim 33 of the condom engages against the annular shoulder 173 of the mandrel.

It will be understood that the mandrel is carried along by the chain 167 to a further stage of the testing procedure previously mentioned, and for any other further treatment steps to be performed. The then emptied vacuum chamber continues to be carried around the apparatus toward the delivery station adjacent the delivery tube 19 where it again extracts an article to be mounted.

It will be appreciated that before reaching the delivery station, the fingers 79 are fully contracted and the jaws 119, 120 are closed, again to define an open cover for the vacuum chamber. It will be further appreciated that each of the vacuum chambers carries out the sequence of operation described, receiving an article from the delivery tube, thereafter causing the article to be distended to form a secondary seal, thereafter breaking the primary seal to free the mouth of the article to be thereafter distended by the spreader, thereafter inserting the article on a mandrel by upward movement of the chamber, thereafter breaking the vacuum externally of the article to mount the article on the mandrel, thereafter lowering the vacuum chamber to clear the article carrying mandrel.

From the foregoing description it will be appreciated that the present invention relates to a completely automated apparatus and method for mounting stretchable, inflatable articles, such as prophylactics, on mandrels or like forms. The method and apparatus are particularly advantageous in that, in advance of any contact between the mandrel and the article, the article is uniformly distended, contact between the parts being effected by a uniform contraction of the prophylactic about the mandrel. By this procedure, the likelihood of damage to the articles by frictional engagement or by non-uniform localized stretching is minimized or entirely obviated.

While specific apparatus has been illustrated and described for purposes of complying with the requirements of the patent laws, such apparatus is not to be considered in a limitative sense except as it is defined in the appended claims. It will be readily recognized, for instance, that other mechanisms for carrying out the sequence of steps hereinabove set forth may be advantageously employed, without departing from the spirit of the invention.

Specifically, it is considered that certain of the steps may be advantageously practiced, to define a semi-automated rather than a fully automated process, with consequent great economies. For instance, it is completely feasible to hand load the articles to the vacuum chambers rather than resorting to mechanical loading. Similarly, a procedure which involves distending the articles in the manner above set forth and manually inserting a mandrel or form will involve economies as contrasted to methods heretofore employed.

I claim:
1. The method of mounting an open mouth elastic, inflatable article, such as a condom or the like, on a mandrel or the like, which comprises the steps of suspending said article while maintaining said mouth in the open position, introducing said suspended article into a vacuum chamber while maintaining said mouth in com- munication with the atmosphere to develop sub-atmospheric pressures exteriorly of said article while maintaining the interior of said article at atmospheric pressure, thus to expand said article to a size exceeding its normal dimension, spreading the mouth portion of said expanded article, inserting a mandrel into said expanded article through said spread mouth portion, and thereafter increasing the pressures against the exterior of said article, thereby to permit said article to contract and elastically embrace said mandrel.

2. The method of mounting an elastic, inflatable article, such as a condom or the like having a resilient mouth, on a mandrel or the like, comprising the steps of supporting said article adjacent said mouth while maintaining said mouth in the open position, introducing said supported article into a vacuum chamber having boundary portions in proximate spaced relation to at least lateral portions of said article while maintaining said mouth in communication with the atmosphere to develop sub-atmospheric pressures exteriorly of said article while maintaining the interior of said article at atmospheric pressure, thus to expand said article to a size exceeding its normal dimension, and shifting said lateral portions of said article into engagement with said boundary portions, thus to fix the position of said article, spreading the mouth portion of said expanded article, inserting a mandrel into said expanded article through said spread mouth portion, and thereafter relieving the vacuum in said chamber, thereby to permit said article to contact and elastically embrace said mandrel.

3. The method of mounting an open mouth, elastic, inflatable article, such as a condom, on a mandrel or the like, comprising the steps of supporting said article adjacent the mouth portion, introducing said supported article into an open work cage of predetermined dimension, forming a seal at a first area adjacent said mouth, subjecting substantially the entire exterior of said article beyond said first area to sub-atmospheric pressure while maintaining the interior of said article open to the atmosphere, thereby to cause said article to expand and line said case and form a second seal area at a portion of said article spaced further from said mouth than said first area, spreading the portions of said expanded article between said mouth and second area, inserting said mandrel into said article through said spread portions and thereafter increasing the pressures on the exterior of said article, thereby to permit said article to contact and elastically embrace said mandrel.

4. The method of claim 3 wherein said article in the cage lining position thereof, is distended to a greater than normal size.

5. Apparatus for mounting an elastic, inflatable article, such as a condom having a resilient, open mouth portion, on a mandrel or like form, comprising a chamber having an entrance, first seal forming means adjacent said entrance engaging the exterior of said article adjacent its said mouth for supporting said article within and sealing the space between the exterior of said article and said chamber, vacuum means in communication with said chamber for reducing to sub-atmospheric levels the pressures within said chamber exteriorly of said article to expand said article, second seal forming means in said chamber in longitudinally spaced relation to said first seal forming means, for sealing engagement with at least substantially the entire exterior of said article responsive to expansion thereof, thereby to form with said article a second seal of said chamber, means for spreading the portions of said expanded article between said mouth and said second seal, means for inserting a mandrel into the interior of said article and means for increasing the pressure within said chamber to permit said article elastically to embrace said mandrel.

6. A device in accordance with claim 5 wherein said first seal forming means is expandible.

7. A device in accordance with claim 5 and including spreader means insertible endwise through said mouth portion of said article in a first contractile position, expansion means for shifting said spreader means outwardly to a second expanded position after formation of said second seal for stretching said mouth portion of said article, said spreader means in said second position providing clearance therethrough for insertion of said mandrel.

8. The device of claim 7 wherein said spreader means comprise a first disc having a wall defining an aperture in registry with said mouth portion, a plurality of fingers movably mounted on said disc and extending through said aperture in depending relation to said disc, said fingers being spaced from said wall in said first contractile position and being shifted toward said wall in said second expanded position.

9. A device in accordance with claim 8 wherein said spreader means is shiftable as a unit toward and away from said mouth portion.

10. A device in accordance with claim 9 wherein said expansion means comprises a second disc having an aperture in registry with the aperture of said first disc, means for relatively rotating said first and second discs, and cam means on said second disc engaging said fingers for shifting said fingers between said first and second positions selectively, responsive to the relatively rotated positions of said discs.

11. The method of mounting an open mouth, elastic inflatable article, such as a condom or the like, on a mandrel or the like which comprises the steps of suspending said article while maintaining said mouth in the open position, forming a first seal area exteriorly of the article adjacent said mouth portion, exposing the exterior of said article beyond said seal area to sub-atmospheric pressures, thereby to cause said article to expand, causing portions of said article more remote from said mouth than said first seal area to form a second seal area responsive to expansion of said article, spreading the portions of said expanded article between said mouth and said second seal area, inserting a mandrel through said spread mouth and into the interior of said expanded article, and thereafter causing the pressures against said exterior to increase, thereby to permit said article to contract and elastically embrace said mandrel.

12. A method in accordance with claim 11 and including the steps of providing a shaped pervious boundary member about said article in advance of reducing said pressure to sub-atmospheric level to thereby cause said article to assume the shape of said boundary member responsive to the exposure of said exterior to said sub-atmospheric pressure.

13. An apparatus for automatically mounting an elastic, inflatable article, such as a condom, having a resilient open mouth portion on a mandrel or the like comprising, in combination, a hopper, means for serially delivering articles from said hopper to a pick-up station, first conveyer means, vacuum chamber means mounted on said conveyer means and movable into proximate spaced relation to said pick-up station, said vacuum chamber means including a seal portion for supporting said article adjacent the mouth thereof and, by engagement with said article, sealing said chamber, vacuum means operatively connected with said chamber for shifting an article from said station into engagement with said seal portion of said chamber and for expanding said article in said chamber, spreader means for stretching said mouth portion of said expanded article responsive to movements of said chamber from said first station to a spreader station, a second conveyor carrying a mandrel member, said first and second conveyers moving in synchronism, means downstream of said spreader station for relatively moving said vacuum chamber and said mandrel toward each other to insert said mandrel through said open mouth portion of said article, and means for increasing the pressure within said chamber in the inserted position of said mandrel thus to permit said article to contract and elastically embrace said mandrel.

14. The apparatus of claim 13 and including means in said chamber for forming a second seal between the exterior of said article and said chamber responsive to expansion of said article, in advance of said spreader means stretching said mouth portion.

15. The apparatus of claim 13 wherein said chamber includes an interior pervious cage portion and said article is caused to expand to conform to said cage portion responsive to said vacuum means.

16. The apparatus of claim 13 wherein said chamber includes an interior shoulder portion adjacent said seal portion in spaced relation to said article in the unexpanded condition thereof and said article is expanded into sealing engagement with said shoulder responsive to said vacuum means.

17. A device in accordance with claim 13 wherein said seal portion is expansible to thereby release said article.

18. The apparatus of claim 17 wherein said conveyer means comprises a horizontally disposed chain flight, said apparatus including a plurality of cam track means disposed substantially in registry with said flight, the apparatus including follower means scanning said tracks for relatively moving said chamber and mandrel for activating said spreader means, and for expanding said seal portion.

19. The method of mounting an inflatable, stretchable article, such as a condom, on a mandrel or the like, comprising the steps of forming a first seal about the exterior of said article adjacent the mouth thereof, exposing the exterior of said article beyond said seal to sub-atmospheric pressures while maintaining the interior of said article in communication with the atmosphere to cause said article to expand, forming a second seal of greater diameter than said first seal against exterior portions of said article spaced further from the mouth than said first seal, breaking said first seal while said sub-atmospheric pressures are maintained by said second seal, expanding the portions of said expanded article between said mouth and second seal, inserting said mandrel into the interior of said article through said expanded mouth, and thereafter increasing said sub-atmospheric pressure to cause said article to contract about said mandrel.

20. A device in accordance with claim 13 wherein said means for serially delivering said articles to said pickup station comprise a suction nozzle, means for sequentially shifting said suction nozzle into said hopper and into registry with said pickup station, and means for developing sub-atmospheric pressure in said nozzle when said nozzle is disposed in said hopper and for increasing said pressure when said nozzle is in registry with said station.

21. A device in accordance with claim 20 wherein said pickup station comprises a delivery tube member having a delivery end adjacent said vacuum chamber means and a receiver end for receiving articles deposited by said suction nozzle means, said delivery end being at a sub-atmospheric pressure when in registry with said vacuum chamber means.

22. A device in accordance with claim 20 and including hopper filler means for filling said hopper from a bulk supply, said filler means including conveyor means for depositing articles in said hopper, vacuum plate means having spaced aperture portions formed on the lower face thereof, means for sequentially moving said plate means from said bulk supply into registry with said conveyor means and means for creating sub-atmospheric pressures in said plate, means when said plate means is in said bulk supply and relieving said sub-atmospheric pressures when said plate means is in registry with said conveyor, whereby articles from said supply are caused to adhere to spaced points on the under surface of said plate means corresponding to said apertures and are deposited in said spaced relation on said conveyor.

23. A device in accordance with claim 20 wherein said hopper includes openings in a floor portion thereof, and air jet means directed upwardly through said openings to agitate and separate articles in said hopper.

24. Apparatus for mounting an elastic inflatable article such as a condom having a resilient mouth portion on a mandrel or like form, comprising a chamber having an entrance, means adjacent said entrance engaging the exterior of said article adjacent its mouth for supporting said article within said chamber, means sealing said chamber adjacent the entrance thereof, means for providing a differential between the pressure in said chamber and in said article to effect expansion of said article in said chamber, means for spreading the mouth portion of said expanded article while maintaining said seal, means for inserting a mandrel into the interior of said article, and means for balancing said differential pressure to permit said article to contract elastically to embrace said mandrel.

References Cited
UNITED STATES PATENTS

| | | | |
|---|---|---|---|
| 894,221 | 7/1908 | Merritt | 29—234 |
| 2,201,706 | 5/1940 | Sukohl | 29—450X |
| 2,408,693 | 10/1946 | Sidebotham | 29—235X |
| 2,715,903 | 8/1955 | Scholl | 29—235X |
| 3,020,192 | 2/1962 | Stephens et al. | 29—235X |
| 3,391,803 | 7/1968 | Povlacs | 214—1BC |
| 3,523,492 | 8/1970 | Bruce | 29—450X |

CHARLIE T. MOON, Primary Examiner

U.S. Cl. X.R.
29—234, 235; 214—1